(12) United States Patent
Palm et al.

(10) Patent No.: US 11,292,504 B2
(45) Date of Patent: Apr. 5, 2022

(54) VEHICLE HAVING MULTIPLE DRIVING POSITIONS

(71) Applicant: Volvo Car Corporation, Gothenburg (SE)

(72) Inventors: Niklas Palm, Gothenburg (SE); Jonas Göthlin, Torslanda (SE)

(73) Assignee: Volvo Car Corporation, Gothenburg (SE)

(*) Notice: Subject to any disclaimer, the term of this patent is extended or adjusted under 35 U.S.C. 154(b) by 85 days.

(21) Appl. No.: 16/359,201

(22) Filed: Mar. 20, 2019

(65) Prior Publication Data

US 2020/0298900 A1    Sep. 24, 2020

(51) Int. Cl.
*B62D 1/22* (2006.01)
*B62D 1/183* (2006.01)
*B62D 1/181* (2006.01)

(52) U.S. Cl.
CPC ............ *B62D 1/22* (2013.01); *B62D 1/181* (2013.01); *B62D 1/183* (2013.01); *B60K 2370/151* (2019.05)

(58) Field of Classification Search
CPC .......... B62D 1/181; B62D 1/22; B62D 1/183; B62D 1/187; B62D 1/10; B62D 1/184;
(Continued)

(56) References Cited

U.S. PATENT DOCUMENTS

| 813,511 A | * | 2/1906 | Neikirk | .................... B62D 1/10 |
| | | | | 74/555 |
| 1,125,539 A | * | 1/1915 | Horowitz | ................. B62D 1/04 |
| | | | | 74/555 |

(Continued)

FOREIGN PATENT DOCUMENTS

| AU | 598153 B2 | 6/1989 |
| DE | 102016210622 A1 | 12/2017 |

(Continued)

OTHER PUBLICATIONS

Dec. 16, 2020 European Search Report issued on International Application No. 20160624.

(Continued)

*Primary Examiner* — Paul N Dickson
*Assistant Examiner* — Timothy Wilhelm
(74) *Attorney, Agent, or Firm* — Clements Bernard Walker; Christopher L. Bernard (57) ABSTRACT

Vehicles, steering systems, and steering assemblies of a vehicle are provided in the present disclosure. According to one embodiment, a steering system includes a track oriented substantially in a side-to-side direction with respect to the vehicle. The side-to-side direction may be substantially horizontal with a ground surface and substantially perpendicular with a forward-facing direction of the vehicle. The steering system also includes a steering wheel adapted to slide laterally along the track. In another embodiments, the present disclosure provides a vehicle comprising a steering wheel assembly adapted to be positioned in laterally variable locations with respect to the vehicle, whereby the steering wheel assembly is further adapted to enable a driver to manually operate the vehicle from a left-hand side of the vehicle and from a right-hand side of the vehicle.

20 Claims, 7 Drawing Sheets

(58) Field of Classification Search
CPC ...... B60K 2370/151; B60K 2370/1515; B60K 2370/155; B60K 37/02; B60K 37/04; G06K 9/00832; G06K 9/00838; G06K 9/00845
See application file for complete search history.

(56) References Cited

U.S. PATENT DOCUMENTS

| | | | | |
|---|---|---|---|---|
| 2,127,171 A * | 8/1938 | Hawthorn | ............. | B62D 1/192 74/493 |
| 2,508,686 A * | 5/1950 | Rice | ............. | B62D 1/22 280/774 |
| 2,544,635 A * | 3/1951 | Ostrow | ............. | B62D 1/22 74/494 |
| 2,584,636 A * | 2/1952 | Sprinkel | ............. | B62D 1/22 74/494 |
| 2,707,109 A * | 4/1955 | Umstott | ............. | B62D 1/22 280/774 |
| 2,749,143 A * | 6/1956 | Chika | ............. | B60R 21/02 280/751 |
| 2,845,315 A * | 7/1958 | McCoy | ............. | B60N 3/002 108/33 |
| 2,845,810 A * | 8/1958 | Sampson | ............. | B62D 1/10 74/493 |
| 2,862,328 A * | 12/1958 | Wadsworth | ............. | B64D 11/06 108/44 |
| 2,905,019 A * | 9/1959 | Sahula | ............. | B62D 1/10 74/493 |
| 2,978,055 A * | 4/1961 | Barenyi | ............. | B60J 1/02 180/78 |
| 2,983,347 A * | 5/1961 | Risk | ............. | B60K 26/02 477/207 |
| 2,988,931 A * | 6/1961 | Markley, Jr. | ............. | B62D 1/183 74/556 |
| 3,167,971 A * | 2/1965 | Wight | ............. | H01H 25/04 74/493 |
| 3,199,625 A * | 8/1965 | Liehreich | ............. | B62D 1/181 180/334 |
| 3,203,709 A * | 8/1965 | Presunka | ............. | B60R 21/02 280/751 |
| 3,335,619 A * | 8/1967 | Curran | ............. | B62D 1/184 74/495 |
| 3,354,743 A * | 11/1967 | Strauss | ............. | G05G 1/30 74/560 |
| 3,395,930 A * | 8/1968 | Morgan | ............. | B62D 1/10 280/775 |
| 3,396,600 A * | 8/1968 | Zeigler | ............. | B62D 1/181 74/493 |
| 3,453,003 A | 7/1969 | Marsell | | |
| 3,548,675 A * | 12/1970 | Grimes | ............. | B62D 1/184 74/493 |
| 3,650,223 A * | 3/1972 | Kobori | ............. | A47B 31/06 108/44 |
| 3,938,404 A * | 2/1976 | Murase | ............. | B62D 1/11 74/492 |
| 3,985,374 A * | 10/1976 | Powaska | ............. | B60N 3/004 280/730.1 |
| 4,413,838 A * | 11/1983 | Varterasian | ............. | B60R 21/02 280/751 |
| 4,463,626 A * | 8/1984 | Kazaoka | ............. | B62D 1/183 180/78 |
| 4,503,504 A * | 3/1985 | Suzumura | ............. | B60R 1/07 280/775 |
| 4,505,356 A * | 3/1985 | Baier | ............. | B62D 1/22 180/20 |
| 4,530,254 A * | 7/1985 | Toyoda | ............. | B62D 1/183 74/493 |
| 4,537,089 A * | 8/1985 | Moneta | ............. | B62D 1/18 280/775 |
| 4,594,909 A * | 6/1986 | Yamaguchi | ............. | B62D 1/183 280/775 |
| 4,648,624 A * | 3/1987 | Mouhot | ............. | B62D 1/184 280/775 |
| 4,722,241 A * | 2/1988 | Yoshida | ............. | B62D 1/183 74/493 |
| 4,753,121 A * | 6/1988 | Venable | ............. | B62D 1/184 280/775 |
| 4,778,133 A * | 10/1988 | Sakurai | ............. | B64C 13/044 244/234 |
| 4,815,331 A * | 3/1989 | Land | ............. | B62D 1/22 180/322 |
| 4,900,059 A * | 2/1990 | Kinoshita | ............. | B62D 1/181 280/775 |
| 4,958,852 A * | 9/1990 | Kohno | ............. | B62D 1/183 280/775 |
| 5,035,446 A * | 7/1991 | Arvidsson | ............. | B62D 1/181 280/775 |
| 5,085,466 A * | 2/1992 | Nakatsuka | ............. | B60R 21/2032 280/731 |
| 5,128,503 A * | 7/1992 | Frantz | ............. | G05G 7/02 200/336 |
| 5,164,645 A * | 11/1992 | Furuse | ............. | B60N 2/0232 318/467 |
| 5,178,411 A * | 1/1993 | Fevre | ............. | B62D 1/181 280/775 |
| RE34,359 E * | 8/1993 | Matsumoto | ............. | B62D 1/181 280/775 |
| 5,351,571 A * | 10/1994 | Johnson | ............. | G05G 1/36 74/478 |
| 5,439,252 A * | 8/1995 | Oxley | ............. | B62D 1/184 280/775 |
| 5,542,360 A * | 8/1996 | Fleming | ............. | A47B 23/04 108/44 |
| 5,560,676 A * | 10/1996 | Griffith | ............. | B60N 3/001 108/44 |
| 5,730,458 A * | 3/1998 | Byon | ............. | B60R 19/00 280/730.2 |
| 5,820,194 A * | 10/1998 | Slayter | ............. | B60N 3/002 296/70 |
| 5,915,776 A * | 6/1999 | Bieri | ............. | B60R 7/06 296/37.12 |
| 5,924,515 A * | 7/1999 | Stauffer | ............. | A01D 67/04 180/326 |
| 5,957,613 A * | 9/1999 | Ruth | ............. | B62D 1/181 403/48 |
| 6,135,546 A * | 10/2000 | Demtchouk | ............. | B60N 3/002 108/44 |
| 6,167,777 B1 * | 1/2001 | Snell | ............. | B62D 1/184 280/775 |
| 6,189,405 B1 * | 2/2001 | Yazane | ............. | B62D 1/184 180/444 |
| 6,241,284 B1 * | 6/2001 | De Verdier | ............. | B62D 1/195 280/777 |
| 6,276,476 B1 | 8/2001 | Farwell et al. | | |
| 6,360,149 B1 * | 3/2002 | Kwon | ............. | B60K 35/00 701/41 |
| 6,382,745 B1 * | 5/2002 | Adkins | ............. | B60N 3/002 108/97 |
| 6,390,505 B1 * | 5/2002 | Wilson | ............. | B62D 1/181 280/775 |
| 6,460,427 B1 * | 10/2002 | Hedderly | ............. | B62D 1/184 280/775 |
| 6,543,807 B2 * | 4/2003 | Fujiu | ............. | B62D 1/184 280/775 |
| 6,688,644 B2 * | 2/2004 | Tsunoda | ............. | B62D 1/184 280/775 |
| 6,692,051 B1 * | 2/2004 | Cook | ............. | B60N 2/062 296/190.01 |
| 6,711,965 B2 * | 3/2004 | Tomaru | ............. | B62D 1/181 280/775 |
| 6,758,518 B2 * | 7/2004 | Ingram | ............. | B64D 11/06 297/146 |
| 6,804,593 B2 * | 10/2004 | Kitano | ............. | B60K 37/06 701/41 |
| 6,820,895 B2 * | 11/2004 | Levine | ............. | B60K 23/02 280/735 |

(56) References Cited

U.S. PATENT DOCUMENTS

| | | | | |
|---|---|---|---|---|
| 6,857,498 B2* | 2/2005 | Vitale | B60K 37/00 | 180/326 |
| 6,902,192 B2* | 6/2005 | Sato | B62D 1/184 | 280/775 |
| 6,964,432 B2* | 11/2005 | Morita | B62D 1/184 | 280/775 |
| 7,097,082 B2* | 8/2006 | Wallaker | B60R 11/02 | 224/483 |
| 7,178,422 B2* | 2/2007 | Armstrong | B62D 1/184 | 280/775 |
| 7,213,673 B2* | 5/2007 | Shabana | G05G 1/405 | 180/334 |
| 7,280,046 B2* | 10/2007 | Berg | B60K 28/066 | 340/576 |
| 7,293,507 B2* | 11/2007 | DePue | B60N 3/002 | 108/152 |
| 7,302,899 B2* | 12/2007 | Zeiger | B63H 25/02 | 114/144 R |
| 7,303,226 B2* | 12/2007 | Bernstein | B60N 2/14 | 296/190.01 |
| 7,331,608 B2* | 2/2008 | Armstrong | B62D 1/181 | 280/775 |
| 7,338,079 B2* | 3/2008 | Yamamoto | B62D 1/184 | 280/775 |
| 7,354,069 B2* | 4/2008 | Yamada | B62D 1/184 | 280/775 |
| 7,363,131 B2* | 4/2008 | Howell | B62D 1/18 | 701/41 |
| 7,422,238 B2* | 9/2008 | Li | B62D 1/184 | 280/775 |
| 7,469,616 B2* | 12/2008 | Fujiu | B62D 1/184 | 74/493 |
| 7,474,204 B2* | 1/2009 | Songwe | B60K 35/00 | 340/461 |
| 7,475,902 B2* | 1/2009 | Shiga | B60R 21/203 | 280/731 |
| 7,494,170 B2* | 2/2009 | Hanzel | B60R 11/00 | 296/37.12 |
| 7,621,562 B2* | 11/2009 | Longo | B62D 1/187 | 280/775 |
| 7,637,360 B2* | 12/2009 | Carlson | B60G 17/0157 | 188/267.2 |
| 7,641,252 B2* | 1/2010 | Sturt | B60N 3/002 | 296/24.34 |
| 7,665,767 B2* | 2/2010 | Olgren | B62D 1/195 | 280/777 |
| 7,719,393 B1 | 5/2010 | Lob | | |
| 7,770,487 B2* | 8/2010 | Kumar | B62D 1/184 | 74/493 |
| 7,946,542 B1* | 5/2011 | Chapman | F16M 11/2014 | 248/122.1 |
| 7,954,852 B2* | 6/2011 | Ueno | B62D 1/16 | 280/775 |
| 8,056,437 B2* | 11/2011 | Rouleau | B62D 1/187 | 74/495 |
| 8,109,565 B2* | 2/2012 | Waters | B60N 2/206 | 297/125 |
| 8,237,389 B2* | 8/2012 | Fitch | B25J 19/06 | 318/563 |
| 8,256,322 B2* | 9/2012 | Takezawa | B62D 1/189 | 74/493 |
| 8,260,482 B1* | 9/2012 | Szybalski | B62D 15/025 | 701/23 |
| 8,307,733 B2* | 11/2012 | Park | B62D 1/187 | 74/493 |
| 8,342,450 B2* | 1/2013 | Funke | B60N 3/001 | 244/118.6 |
| 8,601,901 B2* | 12/2013 | Ishii | B62D 1/184 | 74/493 |
| 8,695,750 B1* | 4/2014 | Hammond | B62D 1/22 | 180/403 |
| 8,714,093 B2* | 5/2014 | Rigner | B60N 3/002 | 108/45 |
| 8,720,299 B2* | 5/2014 | Nakamura | B62D 1/184 | 74/493 |
| 8,746,740 B2* | 6/2014 | Tanaka | B62D 1/18 | 280/777 |
| 8,788,149 B2* | 7/2014 | Kimura | B62D 6/002 | 701/41 |
| 8,863,610 B2* | 10/2014 | Krauter | B62D 1/184 | 74/496 |
| 8,899,623 B2* | 12/2014 | Stadler | B62D 1/192 | 280/777 |
| 8,967,017 B2* | 3/2015 | Osawa | B62D 1/184 | 74/495 |
| 9,007,318 B2* | 4/2015 | Goldman-Shenhar | G06F 3/0485 | 345/173 |
| 9,039,042 B2* | 5/2015 | Moriyama | B62D 1/184 | 280/775 |
| 9,073,574 B2* | 7/2015 | Cuddihy | B60R 21/203 | |
| 9,145,161 B2* | 9/2015 | Nagasawa | B60R 25/021 | |
| 9,150,164 B2* | 10/2015 | Mitchell | B60R 11/0252 | |
| 9,156,498 B2* | 10/2015 | Herzberg | B60K 37/06 | |
| 9,187,011 B2* | 11/2015 | Rouxel | B60N 2/206 | |
| 9,194,168 B1* | 11/2015 | Lu | B60R 25/24 | |
| 9,248,743 B2* | 2/2016 | Enthaler | B60K 37/06 | |
| 9,340,226 B2* | 5/2016 | Osonoi | B62D 1/16 | |
| 9,409,590 B2* | 8/2016 | Johta | B62D 1/184 | |
| 9,428,118 B1* | 8/2016 | Rawlinson | B60N 3/002 | |
| 9,469,196 B2* | 10/2016 | Kim | B60R 21/055 | |
| 9,505,383 B2* | 11/2016 | Peel | G05D 1/0038 | |
| 9,550,513 B2* | 1/2017 | Fujiwara | B60R 25/021 | |
| 9,550,514 B2* | 1/2017 | Schulz | B60R 21/264 | |
| 9,623,897 B2* | 4/2017 | Myohoji | B62D 1/185 | |
| 9,637,160 B2* | 5/2017 | Okano | B62D 1/184 | |
| 9,663,134 B2* | 5/2017 | Imagaki | B62D 1/184 | |
| 9,688,146 B2* | 6/2017 | Kim | B60K 37/04 | |
| 9,738,305 B2* | 8/2017 | Kuwabara | B62D 1/184 | |
| 9,746,874 B2* | 8/2017 | Johnson | G05G 1/44 | |
| 9,758,064 B1* | 9/2017 | Dry | B60N 3/002 | |
| 9,764,756 B2* | 9/2017 | Sugioka | B60N 2/06 | |
| 9,802,638 B1* | 10/2017 | Stoffel | G05G 1/36 | |
| 9,828,016 B2* | 11/2017 | Lubischer | B62D 1/183 | |
| 9,840,271 B2* | 12/2017 | Rouleau | B62D 1/181 | |
| 9,851,882 B2* | 12/2017 | Dai | B60K 35/00 | |
| 9,855,860 B2* | 1/2018 | Ahn | B60N 2/91 | |
| 9,862,327 B2* | 1/2018 | Huebner | B60R 11/0252 | |
| 9,862,403 B1* | 1/2018 | Rouleau | B62D 1/183 | |
| 9,868,458 B1* | 1/2018 | Ravi | B62D 1/184 | |
| 9,896,011 B2* | 2/2018 | Kong | B60N 3/002 | |
| 9,925,903 B2* | 3/2018 | Christiansson | B60N 2/015 | |
| 9,960,800 B2* | 5/2018 | An | H04B 1/3822 | |
| 9,963,035 B2* | 5/2018 | El Aile | B60K 37/04 | |
| 9,994,178 B2* | 6/2018 | Paxton | B60R 21/203 | |
| 10,017,087 B2* | 7/2018 | Dry | E05D 11/1028 | |
| 10,023,091 B2* | 7/2018 | Bendewald | B60N 3/001 | |
| 10,023,124 B2* | 7/2018 | Schmidt | B60R 7/04 | |
| 10,065,671 B2* | 9/2018 | Sugishita | B62D 1/185 | |
| 10,086,732 B2* | 10/2018 | Welch | B60N 3/102 | |
| 10,093,339 B2* | 10/2018 | Bodtker | B62D 1/184 | |
| 10,112,640 B2* | 10/2018 | Bodtker | B62D 1/181 | |
| 10,146,357 B2* | 12/2018 | Bendewald | B60W 50/14 | |
| 10,232,815 B1* | 3/2019 | Dry | B60R 21/207 | |
| 10,300,825 B2* | 5/2019 | Akaike | B61D 33/00 | |
| 10,322,682 B2* | 6/2019 | Faist | G06F 3/0221 | |
| 10,331,314 B2* | 6/2019 | Webb | G06F 3/0488 | |
| 10,343,555 B2* | 7/2019 | Tan | B60N 2/22 | |
| 10,372,270 B2* | 8/2019 | Hoggarth | B60K 35/00 | |
| 10,421,476 B2* | 9/2019 | Rouleau | B62D 1/185 | |
| 10,442,455 B2* | 10/2019 | McKinzie | B62D 1/181 | |
| 10,457,314 B2* | 10/2019 | Swamidason | B62D 5/005 | |
| 10,479,393 B2* | 11/2019 | Sakayanagi | F16F 3/02 | |
| 10,486,532 B2* | 11/2019 | Chapman | B62D 1/10 | |
| 10,562,558 B1* | 2/2020 | Spahn | B62D 1/04 | |
| 10,577,012 B2* | 3/2020 | Dekker | B62D 5/001 | |
| 10,583,740 B2* | 3/2020 | Ory | B60K 37/06 | |
| 10,583,797 B2* | 3/2020 | Line | B60N 2/42763 | |
| 10,585,111 B2* | 3/2020 | Zhang | G01P 15/18 | |

(56) References Cited

U.S. PATENT DOCUMENTS

| | | | | |
|---|---|---|---|---|
| 10,589,641 B2* | 3/2020 | Schmidt | | B60N 2/0248 |
| 10,742,967 B2* | 8/2020 | Hoggarth | | H04N 9/3147 |
| 2002/0066392 A1* | 6/2002 | Calam | | F16M 13/00 |
| | | | | 108/33 |
| 2002/0158448 A1* | 10/2002 | Okonkwo | | B60K 37/00 |
| | | | | 280/728.2 |
| 2003/0066380 A1* | 4/2003 | Cheng | | B62D 1/14 |
| | | | | 74/556 |
| 2003/0094063 A1* | 5/2003 | Cooper | | B62D 1/184 |
| | | | | 74/493 |
| 2003/0183438 A1* | 10/2003 | Higashi | | B62D 1/00 |
| | | | | 180/315 |
| 2004/0016588 A1* | 1/2004 | Vitale | | B62D 1/04 |
| | | | | 180/322 |
| 2005/0018392 A1* | 1/2005 | Strohmeier | | G06F 1/1632 |
| | | | | 361/679.55 |
| 2005/0081674 A1* | 4/2005 | Nishioka | | B62D 1/184 |
| | | | | 74/493 |
| 2005/0218681 A1* | 10/2005 | DePue | | B60N 3/002 |
| | | | | 296/37.12 |
| 2005/0283288 A1* | 12/2005 | Howell | | B62D 1/18 |
| | | | | 701/41 |
| 2006/0028010 A1* | 2/2006 | Yamada | | B62D 1/184 |
| | | | | 280/775 |
| 2006/0197353 A1* | 9/2006 | Hanzel | | B60R 11/00 |
| | | | | 296/37.12 |
| 2007/0029771 A1* | 2/2007 | Haglund | | B62D 1/197 |
| | | | | 280/775 |
| 2008/0027609 A1* | 1/2008 | Aoki | | B62D 5/0463 |
| | | | | 701/43 |
| 2008/0238068 A1* | 10/2008 | Kumar | | B62D 1/183 |
| | | | | 280/775 |
| 2009/0085368 A1* | 4/2009 | Coffelt | | F41G 3/165 |
| | | | | 296/70 |
| 2010/0127847 A1* | 5/2010 | Evans | | G06F 3/04886 |
| | | | | 340/461 |
| 2010/0218637 A1* | 9/2010 | Barroso | | B62D 1/183 |
| | | | | 74/493 |
| 2011/0139535 A1* | 6/2011 | Jhao | | B62D 1/10 |
| | | | | 180/400 |
| 2011/0156478 A1* | 6/2011 | Thorsell | | B60K 37/04 |
| | | | | 307/9.1 |
| 2012/0049558 A1* | 3/2012 | Souillac | | B60R 11/00 |
| | | | | 296/37.12 |
| 2012/0277954 A1* | 11/2012 | Kimura | | B62D 6/001 |
| | | | | 701/41 |
| 2013/0087006 A1* | 4/2013 | Ohtsubo | | B60R 21/05 |
| | | | | 74/493 |
| 2013/0185662 A1* | 7/2013 | Quattrocolo | | B60K 37/06 |
| | | | | 715/764 |
| 2013/0233117 A1* | 9/2013 | Read | | B62D 1/181 |
| | | | | 74/493 |
| 2014/0252811 A1* | 9/2014 | Whalen | | B60N 3/002 |
| | | | | 297/144 |
| 2014/0303807 A1* | 10/2014 | Addepalli | | H04L 67/32 |
| | | | | 701/1 |
| 2015/0343963 A1* | 12/2015 | Angeletti | | B60R 11/0241 |
| | | | | 296/37.12 |
| 2015/0375769 A1* | 12/2015 | Abboud | | B62D 1/184 |
| | | | | 74/493 |
| 2016/0121805 A1* | 5/2016 | Forsgren | | B60K 37/04 |
| | | | | 348/837 |
| 2016/0266778 A1* | 9/2016 | Rawlinson | | B60K 35/00 |
| 2016/0325662 A1* | 11/2016 | Nash | | B60N 3/005 |
| 2016/0347348 A1* | 12/2016 | Lubischer | | G05D 1/0088 |
| 2016/0362126 A1* | 12/2016 | Lubischer | | B62D 1/183 |
| 2016/0368522 A1* | 12/2016 | Lubischer | | B62D 1/183 |
| 2016/0375860 A1* | 12/2016 | Lubischer | | B60R 21/203 |
| | | | | 74/493 |
| 2016/0375924 A1* | 12/2016 | Bodtker | | B60K 35/00 |
| | | | | 74/552 |
| 2016/0375926 A1* | 12/2016 | Lubischer | | B62D 1/183 |
| | | | | 74/493 |
| 2016/0375927 A1* | 12/2016 | Schulz | | B60R 21/203 |
| | | | | 280/775 |
| 2016/0375929 A1* | 12/2016 | Rouleau | | B62D 1/181 |
| | | | | 74/493 |
| 2017/0112274 A1* | 4/2017 | De Saulles | | B60N 3/102 |
| 2017/0151975 A1* | 6/2017 | Schmidt | | B62D 1/183 |
| 2017/0212633 A1* | 7/2017 | You | | G06F 3/04883 |
| 2017/0293306 A1* | 10/2017 | Riefe | | G05D 1/0044 |
| 2017/0297606 A1* | 10/2017 | Kim | | B62D 1/181 |
| 2017/0334452 A1* | 11/2017 | Abe | | G05D 1/0088 |
| 2017/0341678 A1* | 11/2017 | Dekker | | B62D 1/18 |
| 2017/0361863 A1* | 12/2017 | Rouleau | | B62D 1/185 |
| 2018/0052541 A1* | 2/2018 | Hoggarth | | G06T 7/70 |
| 2018/0079426 A1* | 3/2018 | Salter | | G05D 1/0061 |
| 2018/0154921 A1* | 6/2018 | Bonello | | B62D 1/06 |
| 2018/0154932 A1* | 6/2018 | Rakouth | | B62D 1/286 |
| 2018/0251147 A1* | 9/2018 | Heitz | | B62D 1/185 |
| 2018/0272900 A1* | 9/2018 | Fitzpatrick | | B60N 2/01 |
| 2019/0016365 A1* | 1/2019 | Swamidason | | B62D 5/006 |
| 2019/0077263 A1* | 3/2019 | Pegorier | | B60K 37/02 |
| 2019/0077438 A1* | 3/2019 | Collier | | B62D 1/183 |
| 2019/0084609 A1* | 3/2019 | Rogers | | B62D 1/187 |
| 2020/0218442 A1* | 7/2020 | Shin | | G06F 3/017 |

FOREIGN PATENT DOCUMENTS

| | | |
|---|---|---|
| DE | 102017117154 A1 | 1/2019 |
| EP | 1541404 A2 | 6/2005 |
| GB | 771706 A | 4/1957 |
| GB | 2372730 A | 9/2002 |
| WO | 9015747 A1 | 12/1990 |

OTHER PUBLICATIONS

Jul. 9, 2020 Partial European Search Report issued on International Application No. 20160624.

* cited by examiner

VEHICLE HAVING MULTIPLE DRIVING POSITIONS

TECHNICAL FIELD

The present disclosure is generally directed to the automotive field. More particularly, the present disclosure relates to steering assemblies in which a steering wheel of a vehicle can be moved to multiple positions for manual operation, in both manufacturing and use contexts.

BACKGROUND

Currently, vehicles can be manufactured for use in various countries where rules and policies may differ. For example, in some countries, vehicles are driven on the right side of the road, and, in other countries, vehicles are driven on the left side of the road. For use in countries where vehicles are driven on the right side of the road, vehicles are typically manufactured with a steering wheel on the left side of the vehicle. Conversely, in countries where vehicles are driven on the left side of the road, vehicles are typically manufactured with the steering wheel on the right side of the vehicle.

Furthermore, in the field of vehicle manufacturing, a considerable amount of research and development has been focused recently on the technology of autonomous vehicles (AVs), which may also be referred to as automatic driving vehicles (ADVs), self-driving cars, or driverless vehicles. The Society of Automotive Engineers (SAE) has developed a way to define the different levels of driving autonomy in which a vehicle can be controlled. For example, Level 0 is defined as a fully-human operated mode where a human driver controls all aspects (e.g., steering, accelerating, braking, etc.) of vehicle operation, although this level may also include automated systems that can issue warnings for assisting the human driver. On the opposite end of the spectrum, Level 5 is defined as a fully-automated mode in which no human intervention is needed. In fact, Level 5 can sometimes be defined as a robotic taxi mode or a mode where the vehicle can be driven automatically even without human passengers. In some cases, a Level 5 vehicle may be manufactured without a steering wheel or other human interfacing control devices.

Levels 1-4 of the SAE automation definitions include various combinations of human and computer-controlled operation. Level 1 involves human control, but may include some automated assistance, such as cruise control, parking assistance, lane keeping assistance, etc. Level 2 is defined as an automated mode where an automated system can take full control of the vehicle (e.g., steering, accelerating, braking, etc.), but the driver is usually required to be "eyes on" at all times in order to intervene when necessary. Level 3 is a mode where the human driver can be "eyes off" and the automated system can control the vehicle. The driver may intervene within some limited time to provide input in Level 3. Level 4 is a mode where the human driver can be "mind of" and the automated system can control the vehicle fully, in this mode, human control may be non-existent or limited to certain conditions, such as for driving in undefined spatial areas, for making human decisions in traffic jam conditions, etc.

Thus, there are numerous ways that vehicles can be manufactured in today's market to account for a number of different driving scenarios. For example, when operating the vehicle in a human-controlled mode (e.g., Levels 0-2), a driver can be positioned either on the left or right side of the vehicle depending on the rules of the country in which the vehicle is being driven. If a vehicle is configured for use in more automated modes (e.g., Levels 3-5), the steering wheel, accelerator, and brake pedal may not necessarily be used on a regular basis by a human driver, and in some situations, a human may not necessarily be seated in a conventional driving position.

Therefore, there is a need for flexibility in the design of manual-driving positions within a vehicle to accommodate the various driving scenarios mentioned above. Also, there is a need for a vehicle design that can allow this flexibility in a way that is convenient, easy to operate, and safe for the driver and passengers.

SUMMARY

Accordingly, the present disclosure includes vehicles and steering assemblies allowing a steering wheel to be positioned at multiple lateral positions for control by a human operator. In one embodiment, a steering system of a vehicle is provided, whereby the steering system includes a track oriented substantially in a side-to-side direction with respect to the vehicle. The side-to-side direction may be defined as being substantially horizontal with a ground surface and substantially perpendicular with a forward-facing direction of the vehicle. The steering system further includes a steering wheel adapted to slide laterally along the track.

According to another embodiment, a vehicle is defined by a front/back axis substantially oriented in a forward-facing direction. The vehicle may include a lateral track arranged substantially along a lateral axis perpendicular with the front/back axis of the vehicle. The vehicle may also include a steering wheel assembly adapted to slide laterally along the lateral track.

According to yet another embodiment, the present disclosure further provides a vehicle having a steering wheel assembly adapted to be positioned in laterally variable locations with respect to the vehicle. The steering wheel assembly may be further adapted to enable a driver to manually operate the vehicle from at least a left-hand side of the vehicle or a right-hand side of the vehicle.

BRIEF DESCRIPTION OF THE DRAWINGS

The present disclosure is directed to various embodiments illustrated and described herein with reference to the various drawings, in which like reference numbers are used to denote like system or assembly components/methods or algorithm steps. The illustrated components of the various systems are not necessarily drawn to scale.

DESCRIPTION OF EMBODIMENTS

According to the present disclosure, various embodiments are described in which a steering wheel can be moved to a left-hand side of the vehicle, a right-hand side of the vehicle, and locations therebetween. This allows a vehicle to be operated (or manufactured) in different countries where driving rules may be different (e.g., where a vehicle is driven on the right side of the road or on the left side of the road).

Also, with the flexibility of driving positions or manual steering stations for a human driver, the steering assemblies described in the present disclosure may be configured for use with automated systems that at least partially control the operations (e.g., steering, accelerating, braking, etc.) of the vehicle. The steering wheel of the steering assemblies described herein can be moved out of the way for these automated driving conditions.

In addition to steering wheel positioning, the vehicles described in the present disclosure may also include other vehicle equipment that can be moved to different positions to allow a human driver to operate the vehicle from these various manual steering stations. For example, if the steering wheel is moved to a left side of the vehicle for use by a driver in the left front seat, movable acceleration and brake controls may also be moved to a left side of a front floor panel so that the driver can also control the acceleration and deceleration of the vehicle as needed. Other equipment, as mentioned in more detail below, may also be movable within the vehicle to keep these additional vehicle components in or near an established driver station.

The embodiments of the present disclosure thereby provide great flexibility in the positioning of driver stations or manual steering stations to allow the driver to safely operate the vehicle when the vehicle is in a human-controllable mode. Another advantage is that when the vehicle is operated in a mode that is primarily automated, the controls can be moved away from human passengers to improve the comfort of the passengers, although the controls can still be accessed from any suitable position when they are needed, such as if the vehicle is manually driven in an off-road scenario, manually driven into a bay or other work area where repairs, oil changes, etc. can be performed on the vehicle, and/or other situations where human involvement may be needed.

For example, the control systems (e.g., steering systems, acceleration systems, and braking systems) may be configured as "drive-by-wire" systems, wherein the systems include manual activation elements (e.g., steering wheel, acceleration activator, deceleration activator, etc.), but these elements may not necessarily be directly connected to mechanical components for controlling the vehicle. Instead of a direct connection to mechanical actuators, the manual activation elements may provide electrical output signals that can be communicated through a dedicated system of electrical conductors or via a wireless communication protocol. These electrical output signals can therefore be communicated to associated mechanical actuators that are configured to perform the physical operations that control the vehicle.

Although the embodiments of the present disclosure are described for human driving scenarios where the driver is positioned in a front seat of the vehicle, it should be noted that the controls can be positioned anywhere on the vehicle. Thus, a driver may be able to control the steering, accelerating, and braking from any position within the interior of the vehicle or even outside the vehicle.

Figure 1:
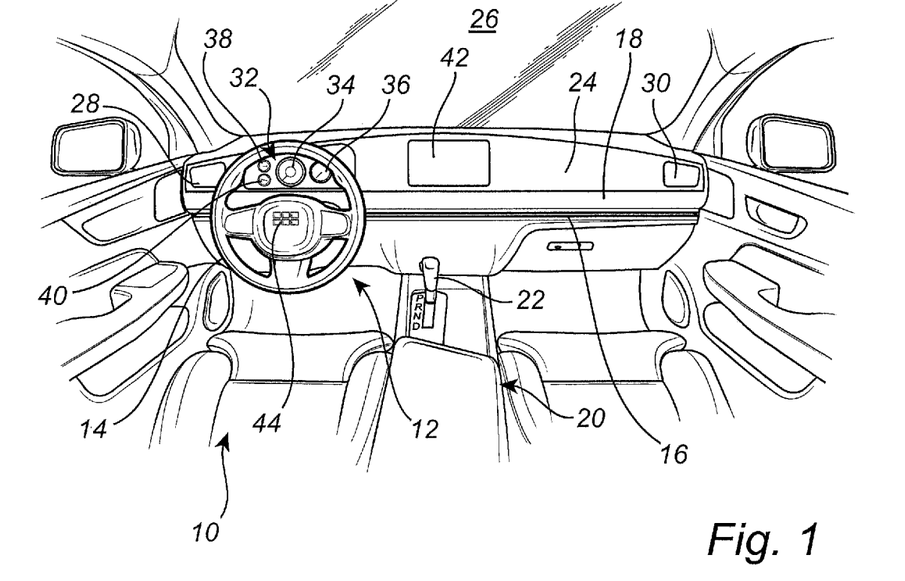
FIG. 1 is a diagram showing a forward-facing view of an inside of a vehicle having a steering assembly with a laterally movable steering wheel positioned for a left-hand steering mode, according to various embodiments of the present disclosure.

FIG. 1 illustrates a forward-facing view of an inside of a vehicle 10 according to some embodiments. The vehicle 10 in this embodiment includes a steering assembly 12 or steering system having a laterally movable steering wheel 14. In FIG. 1, the steering wheel 14 is positioned for operation in a left-hand steering scenario to establish a left-side manual-steering station. The left-hand steering scenario or left-side manual-steering station may be defined as a mode where the steering wheel 14 is positioned generally on a left side (i.e., port side) of the vehicle 10 for operation by a driver positioned in a left-hand seat on the front, left side of the interior of the vehicle 10. The left-hand steering mode is normally associated with vehicles used in countries where vehicles are driven on the right side of the road.

In addition to the steering wheel 14, the steering assembly 12 includes a track 16 formed in a dashboard 18. The track 16 may be arranged in a substantially horizontal manner with respect to a ground plane on which the vehicle 10 rests. The track 16 may also be arranged substantially in a direction from one side of the vehicle 10 to the other (e.g., a left-to-right direction). Thus, the track 16 may lie generally along a path or near an axis that is substantially perpendicular to a forward-facing direction of the vehicle 10. In some embodiments, the track 16 may be oriented along a straight line, a curved path, or any suitable path between the left side (i.e., port side) of the vehicle 10 and the right side (i.e., starboard side) of the vehicle 10.

Therefore, the track 16 allows the steering wheel 14 and associated components of the steering assembly 12 to be moved along its path to position the steering wheel 14 according to various modes or manual-driving stations. The steering wheel 14 can be moved during a vehicle manufacturing process and set at a predetermined position for left-hand or right-hand modes. However, according to other embodiments, the steering wheel 14 can be moved by a user after a vehicle manufacturing or vehicle purchasing event for after-market arrangement of the steering assembly 12.

Also shown in FIG. 1 is a center console 20 having, among other things, a gear shifting device 22. The gear shifting device 22 allows a driver in a manual or semi-manual mode to shift gears of the vehicle 10. As positioned on the center console 20, the gear shifting device 22 may be adapted to be utilized by a driver in the left-hand driving mode or in a right-hand driving mode.

Figure 2:
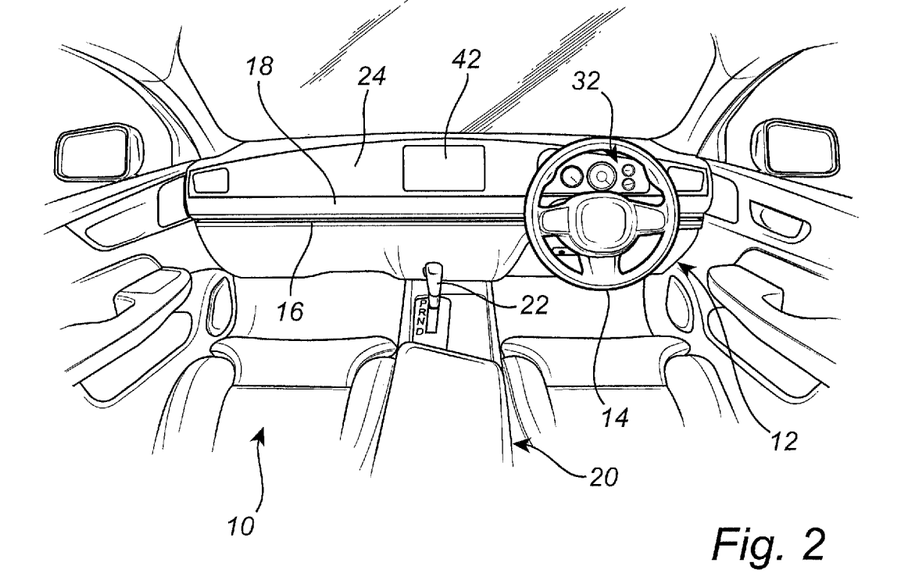
FIG. 2 is a diagram showing a forward-facing view of the inside of the vehicle having the steering assembly shown in FIG. 1 with the laterally movable steering wheel positioned for a right-hand steering mode, according to various embodiments.

Depending the type of vehicle 10 in which the steering assembly 12 of the present disclosure is incorporated, the gear shifting device 22 may have various configurations. For example, if the vehicle 10 has a manual transmission, the gear shifting device 22 may include a gear shifting shaft that is adapted to be moved in an up/down and side-to-side manner. For an automatic transmission, the gear shifting device 22 may have a more linear shifting movement and may include park ("P"), reverse ("R"), neutral ("N"), and drive ("D") gears. In some embodiments of vehicles with automatic transmission, the gear shifting device 22 may further include specific gear numbers (e.g., 4, 3, 2, etc.). In the left-hand driving mode as shown in FIG. 1, the driver may normally use his or her right hand to change gears using the gear shifting device 22. In a right-hand driving mode as shown in FIG. 2, the driver may normally use his or her left hand to change gears.

The vehicle 10 may further be adapted to include a display panel 24 positioned at a back end of the dashboard 18 next to a front windshield 26 or windscreen. The display panel 24 may be adapted to include light emitting diodes (LEDs), a liquid crystal display (LCD), lamps, or other suitable light and image display elements for visually communicating numerous types of information to the driver. For example, the display panel 24 may be adapted to show the operational conditions of the vehicle 10, side views of the vehicle 10, a rear view from a rear-facing camera, maps, etc.

In other embodiments (such as the embodiments described below with respect to FIGS. 8 and 9), all or parts of the information displayed on the display panel 24 may alternatively be displayed on other display devices. According to the embodiment of FIG. 1, the display panel 24 may be arranged in a rear-facing direction with respect to the vehicle 10 in order to face the driver.

The display panel 24 may include a left rear-view image 28 on a left end of the display panel 24 and a right rear-view image 30 on a right end of the display panel 24. The left rear-view image 28 may be adapted to show an image that might normally be seen by the driver when viewing a conventional rear-view mirror located outside the vehicle 10 on a front portion of the left front door. The right rear-view image 30 may be adapted to show an image that might normally be seen by the driver when viewing a conventional rear-view mirror located outside the vehicle 10 a front portion of the right front door. The vehicle 10 may include rear-facing cameras positioned where the conventional rear-view mirrors may normally be located to capture the images that are displayed as the left and right rear-view images 28, 30 displayed on the display panel 24. The left and right rear-view images 28, 30, according to some embodiments, may be adapted to be displayed on the display panel 24 at the same place (i.e., at the far left and far right ends of the display panel 24).

The instrument panel display 32 may have any suitable configuration for displaying certain types of information to the driver. For example, the instrument panel display 32 may include graphical images of various gauges and/or may include the actual gauges or sensors. The instrument panel display 32 may include a speedometer 34 (or image of a speedometer), a tachometer 36 (or image of a tachometer), a fuel gauge 38 (or image of a fuel gauge), an engine temperature gauge 40 (or image of an engine temperature gauge), etc. In some embodiments, the instrument panel display 32 may be adapted to display fewer or more gauges/sensor that what is shown in FIG. 1. For example, the instrument panel display 32 may further include a time display, an outside temperature display, a battery charge gauge, and/or other displays.

According to some embodiments related to displaying images that represent actual gauges and sensors, the display panel 24 may be adapted to display the instrument panel display 32 at different locations on the display panel 24. Particularly, the display panel 24 may be adapted to display the image of the instrument panel display 32 in a location behind the positioning of the steering wheel 14. Thus, if the steering wheel 14 is positioned on the left-hand side of the vehicle 10, as illustrated in FIG. 1, the instrument panel display 32 may be shown directly behind the steering wheel 14 to increase the driver's visibility of the instrument panel display 32.

The display panel 24 may also include one or more additional displays 42 thereon. For example, some configurations of additional displays 42 may include road maps, directions, compass indications, directional instructions, etc. for communicating driving instructions to the driver for driving to a particular destination. In some embodiments, an additional display 42 may include cellular or mobile phone information. Another additional display 42 may include information regarding weather conditions or a weather forecast for the vicinity of the vehicle 10 and/or the conditions (e.g., temperature) of one or more areas within the passenger cabin of the vehicle 10.

FIG. 2 illustrates another forward-facing view of the inside of the vehicle 10 of FIG. 1. In this drawing, the steering assembly 12 is shown with the laterally movable steering wheel 14 positioned on the track 16 in the dashboard 18 for a right-hand steering mode. The right-hand steering mode may be defined as a mode where the steering wheel 14 is positioned generally on a right side (i.e., starboard side) of the vehicle 10 for operation by a driver positioned in a right, front seat of the vehicle 10. In this mode, the manual-driving station is established at the right side of the vehicle 10. The right-hand steering mode or right-side manual-driving station is normally associated with vehicles used in countries where vehicles are driven on the left side of the road.

The gear shifting device 22 on the center console 20 in the right-hand driving mode shown in FIG. 2 allows a driver in a manual-driving or semi-manual-driving mode to shift gears of the vehicle 10, typically using the driver's left hand. As mentioned above, the gear shifting device 22 may include other alternative shifting mechanics and gear choices according to other embodiments.

Also, as shown in FIG. 2, the display panel 24 may further include the instrument panel display 32 displayed at a position that is behind the positioning of the steering wheel 14 on the right side of the track 16. Thus, when the vehicle 10 is manually operated by driver at a right-hand position, the instrument panel display 32 may be shown on the right side of the display panel 24 directly behind or near the steering wheel 14 to increase the driver's visibility of the instrument panel display 32. The one or more additional displays 42 may be rearranged on the display panel 24 with respect to the arrangement shown in FIG. 1 to accommodate the positioning of the instrument panel display 32.

Figure 3:
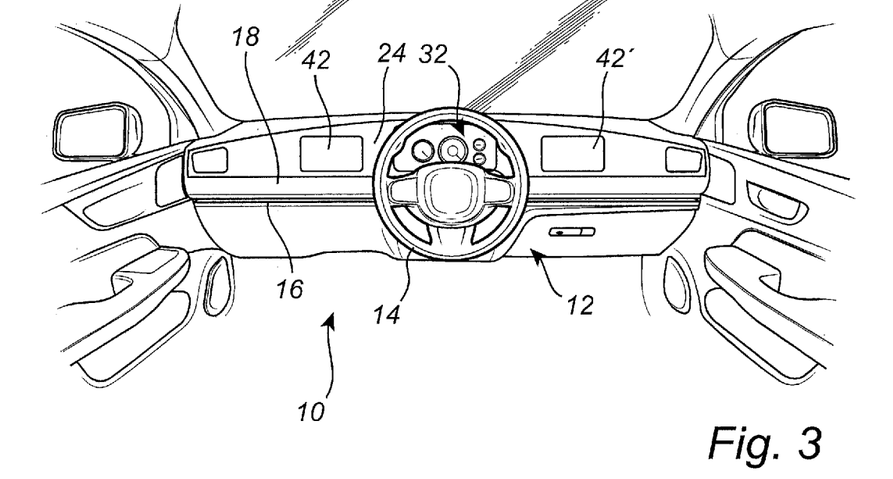
FIG. 3 is a diagram showing a forward-facing view of the inside of the vehicle having the steering assembly shown in FIG. 1 with the laterally movable steering wheel positioned in a center location for autonomous driving, according to various embodiments.

FIG. 3 shows another forward-facing view within the vehicle 10 with the steering wheel 14 of the steering assembly 12 arranged in a center position. For example, if the vehicle 10 is equipped for usage as a self-driving or autonomous vehicle (AV) in a completely or partially automatic mode, the steering wheel 14 can be moved out of the way of passengers in the front left seat or front right seat of the vehicle 10. When configured as an AV, the vehicle 10 may be adapted such that the track 16 and/or dashboard 18 enable the steering wheel 14 to collapse or fold down and be hidden away within the dashboard 18.

The arrangement shown in FIG. 3 may also be used in a vehicle that has a center front seat, a bench seat in the front row of the vehicle 10, or a laterally movable seat that can be positioned in a center position (e.g., as described with respect to FIG. 14 below). Also, with the possibility of operating the vehicle 10 from a center position, as is possible with the implementations of the steering assembly 12 described in the present disclosure, the center console 20 of the vehicle 10, as shown in FIGS. 1 and 2, may be omitted, thus giving the center-positioned driver adequate leg room and allowing the driver to operate pedals or other suitable acceleration activator devices and deceleration activator devices on a floor panel of the vehicle 10 (e.g., as described with respect to FIGS. 4-7).

The vehicle 10 may furthermore be adapted, as illustrated in FIG. 3, such that the display panel 24 includes the instrument panel display 32 shown at a central position behind the steering wheel 14 location. Thus, when the vehicle 10 is manually operated by a driver from this central position, the instrument panel display 32 can be easily viewed by the driver. Also, in this arrangement, the display panel 24 may one or more additional displays 42 positioned on the left side of the instrument panel display 32 and/or one or more additional displays 42 positioned on the right side of the instrument panel display 32.

According to some embodiments, the steering wheel 14 may include one or more selectors 44 or other type of selection components for allowing the driver to select a level of autonomy for driving the vehicle. For example, the selectors 44 may allow the driver to select any level from Level 0 through Level 5 of the SAE definition of autonomous driving modes, depending on the modes that are available on the vehicle 10. Other selections can be made using selectors 44.

Therefore, according to some embodiments, the vehicle 10 may be equipped with the track 16 oriented substantially in a side-to-side direction with respect to the vehicle 10. The side-to-side direction may be defined as a substantially horizontal direction with respect to a ground surface on which the vehicle 10 rests and may be substantially perpendicular with a forward-facing direction of the vehicle 10. In addition to the track 16, the vehicle 10 may also include the steering wheel 14 adapted to slide laterally along the track 16.

The vehicle 10 can be operated in a first mode or a second mode, the first mode being defined as a fully human-operated mode and the second mode being defined as a driver-assisted mode, autonomous mode, automatic driving mode, self-driving mode, or driverless mode. When operated in the second mode, the steering wheel 14 may be adapted to be fixed in a center position (FIG. 3) along the track 16. Also, in the second mode, the steering wheel 14 may be adapted to be collapsed under the instrument panel or dashboard 18 of the vehicle 10.

In some embodiments, the vehicle 10 may further comprise the display panel 24 positioned adjacent to the dashboard 18. The display panel 24 may be adapted to display an instrument panel image 32 at a position on the display panel 24 corresponding to the positioning of the steering wheel 14 along the lateral track 16. The instrument panel image 32 may include at least one operational condition of the vehicle (e.g., speed 34 of the vehicle, engine speed 36 in revolutions per minute, fuel level 38, engine temperature 40, etc.).

Regarding the embodiments of the steering assembly 12 with a laterally movable steering wheel 14, as described above and illustrated in FIGS. 1-3, the vehicle 10 may further be adapted to include additional vehicle equipment used in conjunction with the steering assembly 12 for establishing manual-driving stations at different locations. For example, by allowing a driver to manually operate the vehicle 10 from various lateral positions within the vehicle 10, other vehicle systems (e.g., for controlling the acceleration and deceleration of the vehicle 10) may also have the capability of being moved as needed.

The vehicles systems described below may allow positioning at various positions during manufacture and then may be permanently fixed at certain locations. In alternative embodiments, the vehicle systems described below may be repositionable by a user in an after-market scenario. Thus, the user may be able to move the vehicle systems to accommodate various driving modes for driving from a left-hand position, from a right-hand position, or from a center position. Also, in some embodiments of the steering assembly 12 described above and the various vehicle systems described below, numerous manual-driving stations can be established at any position between a far-left position and a far-right position.

Figure 4:
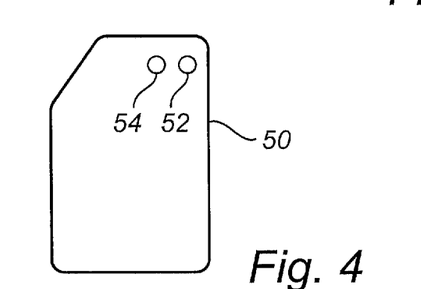
FIG. 4 is a diagram showing a top view of a floor mat for a vehicle, the floor mat having an acceleration activator device and deceleration activator device formed therein, according to various embodiments.

FIG. 4 shows a top view of an embodiment of a floor mat 50 for a vehicle having a steering assembly that allows a steering wheel to be positioned at multiple lateral (i.e., side-to-side) locations. In this embodiment, the floor mat 50 includes an acceleration activator device 52 and a deceleration activator device 54 formed in the floor mat 50.

The acceleration activator device 52 may be adapted as an accelerator pedal, a pressure sensitive pad, a hydraulically actuated sensor, a pneumatically actuated sensor, or any other suitable type of pedal, pad, or sensor for receiving a pressure input applied by a driver (e.g., using the driver's foot or feet) to the pedal, pad, or sensor. In addition to the mechanical aspects of the acceleration activator device 52 for receiving the pressure input, the acceleration activator device 52 may also include mechanical and/or electrical outputs to control the power applied to an engine or motor of the vehicle to cause the vehicle to accelerate.

Likewise, the deceleration activator device 54 may also be adapted in any suitable form as a pedal, pressure sensitive pad, hydraulic system, pneumatic system, sensor, etc. The deceleration activator device 54 is also capable of detecting a pressure input and is associated with mechanical vehicle systems (e.g., brake system, electric motor system for converting kinetic energy into electrical energy, or other deceleration systems) to enable the vehicle to slow down or stop.

According to various embodiments, the acceleration activator device 52 and deceleration activator device 54 may be configured as drive-by-wire devices that utilize electrical signals to transmit control instructions to various mechanical actuators that may be used to increase or decrease the speed of the vehicle. These drive-by-wire devices may be defined as "accelerate-by-wire" and "decelerate-by-wire" devices for accelerating and braking.

Figure 5:
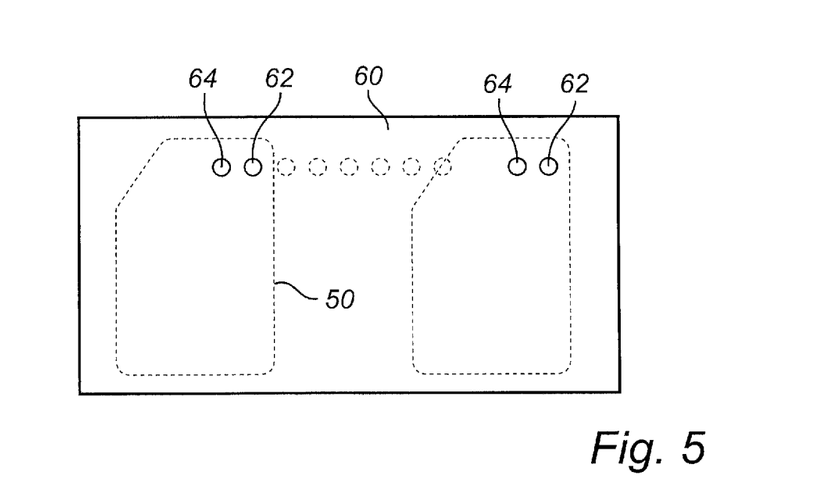
FIG. 5 is a diagram showing a top view of a floor panel of a vehicle, the floor panel being used in association with the floor mat of FIG. 4, according to various embodiments.

FIG. 5 illustrates a top view of a portion of a floor panel 60 of a vehicle in which the floor mat 50 of FIG. 4 may be used. The floor panel 60 may include communication spots where the acceleration activator device 52 and deceleration activator device 54 can transmit sensed pressure signals. The communication spots of the floor panel 60 may include a row of electrically conductive contacts or wireless receivers for communicating with the controllers 52, 54.

An acceleration signal receiver 62 is configured to receive electrical signals (e.g., wirelessly or via electrical conductors) from the acceleration activator device 52 in a continuous manner. While receiving on-going acceleration signals based on the current amount of pressure sensed by the acceleration activator device 52, the acceleration signal receiver 62 may be adapted to continually transmit the acceleration signals to a carburetor or other fuel controlling device of an internal combustion engine or to a controller for increasing the power to an electrical motor (i.e., when the vehicle is configured as an electric or hybrid vehicle).

Additionally, the floor panel 60 may include a deceleration signal receiver 64, which may be adapted to receive electrical signals (e.g., wirelessly or via electrical conductors) from the deceleration activator device 54 in a continuous manner. While receiving the on-going deceleration signals, the deceleration signal receiver 64 may be configured to transmit instructions to associated braking systems and/or other deceleration systems for slowing or stopping the vehicle.

As illustrated in FIG. 5, the acceleration signal receiver 62 and deceleration signal receiver 64 may be arranged in pairs along the floor panel 60. For example, a first pair of receivers 62, 64 may be incorporated into the floor panel 60 on its left side to define a position (e.g., left side manual-driving station) that allows the floor mat 50 to be positioned in a left-side position where a driver of the vehicle in the left-hand driving mode may operate the vehicle. Also, at a right side of the floor panel 60, a second pair of receivers 62, 64 may be incorporated into the floor panel 60 to define a position that allows the floor mat 50 to be positioned in a right-side position where a driver of the vehicle in the right-hand driving mode may operate the vehicle. As is also shown in FIG. 5, other receivers may be incorporated in the floor panel 60 in between the left-side and right-side positions for allowing the floor mat 50 to be positioned at various lateral positions along the floor panel 60.

In some embodiments, the receivers 62, 64 may be adapted such that each can be capable of receiving signals from either one of the acceleration activator device 52 or deceleration activator device 54. As such, a signal may be communicated between the controllers 52, 54 and receivers 62, 64 indicating whether the controller 52, 54 is adapted to monitor acceleration or deceleration in order that the receivers will know what type of signal is being received.

The acceleration activator device 52 and deceleration activator device 54 may include electrical contacts on the underside of the floor mat 50 that correspond with electrical contacts on the floor panel 60 to enable electrical communication between the activator devices 52, 54 and receivers 62, 64. In addition to electrical contacts, the underside of the floor mat 50 and the top of the floor panel 60 may include locking and/or positioning members for enabling the floor mat 50 to be properly aligned with the floor panel 60 such that the electrical contacts can be engaged. The locking and/or positioning members may include corresponding snaps, corresponding magnets, or other members for enabling proper alignment and connection between the mat 50 and floor panel 60. The receivers 62, 64 are also adapted to include electrical circuitry configured to communicate acceleration and deceleration signals to appropriate electro-mechanical actuators.

Figure 6A:
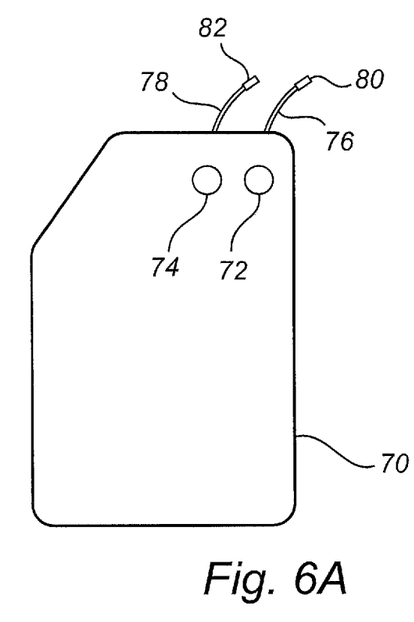
FIG. 6A is a diagram showing a top view of another floor mat having an acceleration activator device and deceleration activator device formed therein, according to various embodiments.

FIG. 6A shows another embodiment of a floor mat 70 having an acceleration activator device 72 and a deceleration activator device 74 formed therein. The acceleration activator device 72 and deceleration activator device 74 in this embodiment may be adapted to include the same or similar pressure sensing components as the respective activator devices 52, 54 described with respect to FIG. 4. However, this embodiment may differ from the embodiment of FIG. 4 in that the floor mat 70 may further include electrical conductors 76, 78 for electrically communicating acceleration and deceleration signals respectively obtained by the activator devices 72, 74. The ends of the conductors 76, 78 may include electrical connectors 80, 82, respectively, configured to connect the controllers 72, 74 to electrical circuitry of the vehicle that can receive the control signals and providing actuation instructions to corresponding mechanical and/or electrical systems for increasing or decreasing the vehicle speed. In order to avoid any discrepancy between the identity of the acceleration and deceleration controls, the connectors 80, 82 may have different connection characteristics such that only the acceleration activator device 72 can communicate with corresponding acceleration systems of the vehicle and only the deceleration activator device 74 can communicate with corresponding deceleration systems of the vehicle.

Figure 6B:
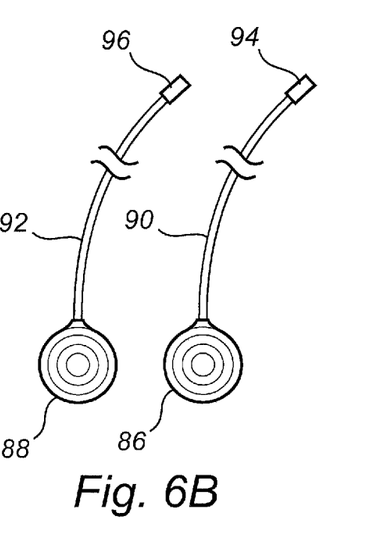
FIG. 6B is a diagram showing a view of an acceleration activator device and a separated deceleration activator device, according to various embodiments.

FIG. 6B shows an alternative embodiment whereby an acceleration activator device 86 and a deceleration activator device 88 are not incorporated within a floor mat (e.g., floor mats 50, 70). According to this embodiment, the acceleration activator device 86 and deceleration activator device 88 may be adapted as separately movable parts and can be arranged at any suitable positions on the floor panel of the vehicle. In an arrangement similar to the embodiment of FIG. 6A, the controllers 86, 88 may also include electrical conductors 90, 92 for electrically communicating signals indicative of pressure sensitive inputs from the driver. The ends of the conductors 90, 92 may respectively also include electrical connectors 94, 96 (e.g., which may be adapted to include different form factors to avoid confusing acceleration and deceleration signals). The connectors 94, 96 may be adapted for connection with corresponding connectors on the vehicle.

Figure 7:
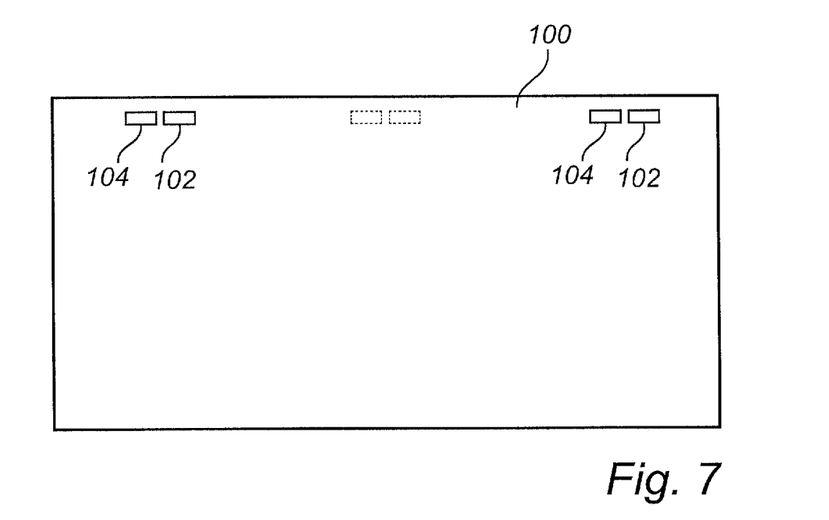
FIG. 7 is a diagram showing a top view of another floor panel of a vehicle, the floor panel being used in association with the floor mat of FIG. 6A or the acceleration activator device and deceleration activator device of FIG. 6B, according to various embodiments.

FIG. 7 illustrates a top view of another embodiment of a floor panel 100 of a vehicle. In this embodiment, the floor panel 100 may be adapted to be used in a vehicle in association with the floor mat 70 of FIG. 6A and/or with the activators 86, 88 of FIG. 6B. The floor panel 100 may include a first compatible electrical connector 102 for connection with the acceleration activator devices 72, 86 via connectors 80, 94 and a second compatible electrical connector 104 for connection with the deceleration activator devices 74, 88 via connectors 82, 96.

A first pair of connectors 102, 104 is shown at a left side of the floor panel 100 to accommodate a driver configured to operate the vehicle from a left-hand side of the vehicle. Another pair of connectors 102, 104 is shown at a right side of the floor panel 100 to accommodate a driver configured to operate the vehicle from a right-hand side of the vehicle. In some embodiments, the floor panel 100 may include additional pairs of connectors 102, 104 for allowing foot-actuated acceleration and deceleration controls from essentially any lateral position in the vehicle.

Therefore, a manual-driving station (i.e., where a driver and driving-control equipment are positioned) can be established at practically any lateral location along a side-to-side direction of the vehicle. In some embodiments, the steering wheel 14 of the steering assembly 12 described with respect to FIGS. 1-3 may be oriented first at a desired position to establish the driver station. Then, the various embodiments of the foot-actuated acceleration and deceleration activators as described with respect to FIGS. 4-7 can be positioned according to the established driver station as defined by the position of the steering wheel 14. Of course, these systems can be set up in any order to define the driver stations.

Figure 8:
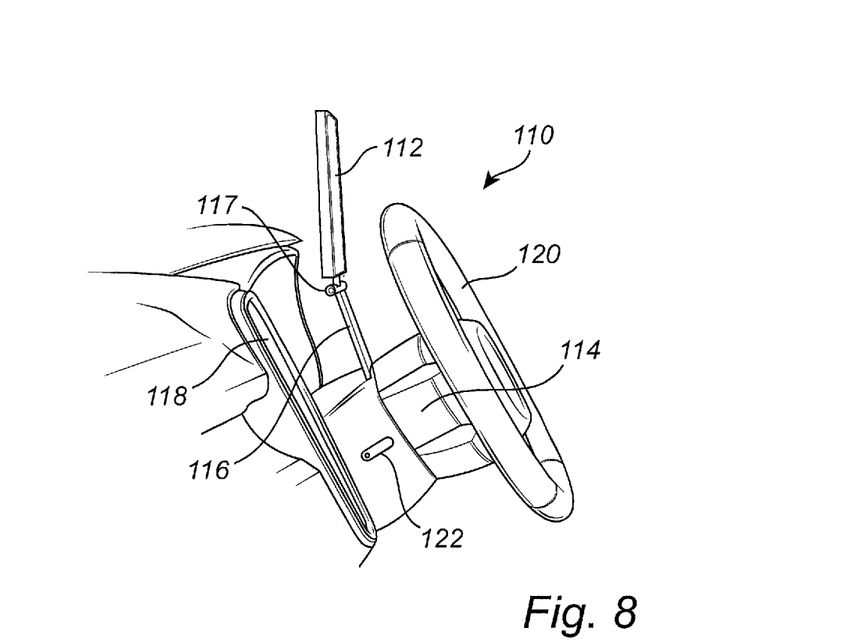
FIG. 8 is a diagram showing a side view of a steering assembly having a display device attached to a steering column housing of the steering assembly, according to various embodiments.

FIG. 8 is a side view showing an embodiment of a steering assembly 110, wherein the steering assembly 110 includes a display device 112 attached to a steering column housing 114 of the steering assembly 110. In some embodiments, the display device 112 may be connected to the steering column housing 114 via bracket member 116. The bracket member 116 may include a rotational element 117 allowing the user to tilt the display device 112 in forward or backward directions.

The steering assembly 110 may be connected to a dashboard 118 of the vehicle via a track (not shown in FIG. 8) to allow side-to-side movement (i.e., into or out of the page of FIG. 8). Thus, the user can arrange a steering wheel 120 of the steering assembly 110 in a desired lateral position. With the side-to-side variable positioning of the steering wheel 120, the display device 112 may be adapted as an instrument panel having actual gauges and/or sensors or in other embodiments may be adapted to display images mimicking an instrument panel. Thus, regardless of the position of the steering wheel 120, the driver can see the operational conditions of the vehicle (e.g., speed, engine speed, fuel level, etc.) displayed by the display device 112 that moves along with the steering wheel 120.

The steering column housing 114 may include a shaft for enabling the steering wheel 110 to be rotated. The shaft may include structure to allow the steering wheel 120 to have the feel of a rack and pinion steering system, even though the steering assembly 110 may be a steer-by-wire device. As a steer-by-wire assembly, the steering column housing 114 may include electromechanical elements for sensing the rotation of the steering wheel 120 and provide electrical signals that can be communicated to steering actuators for turning the wheels of the vehicle 10. In some embodiments, the electrical signals may be communicated to the steering actuators via the track or electrical contacts within the track.

In some embodiments, the steering assembly 110 may include a locking device 122. The locking device 122 may be adapted to lock the steering column housing 114 and/or a runner (e.g., the runner 168 described below with respect to FIG. 11) at a fixed position along the lateral track 16. The locking device 122 may include levers and/or other components for wedging or applying a locking component in or against the track 16 or dashboard 118.

Figure 9:
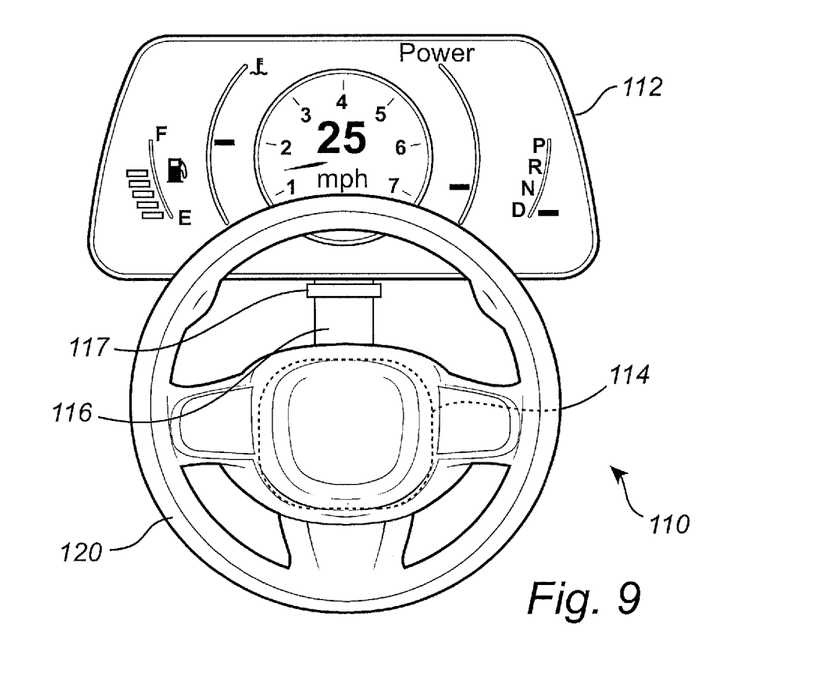
FIG. 9 is a diagram showing a front view of the steering assembly of FIG. 8, according to various embodiments.

FIG. 9 is a diagram showing a front view of the steering assembly 110 of FIG. 8, according to various embodiments. In this embodiment, the display device 112 may be adapted as an instrument panel including a speedometer or speed indicator, tachometer, fuel gauge, temperature gauge, power gauge, gear indicator, and/or other indicators or gauges.

According to other embodiments, the display device 112 may include fewer or more indicators or gauges as shown in FIG. 9. Since the bracket 116 may be connected directly to the steering column housing 114, which moves along with the steering wheel 120, the display device 112 may likewise be moved correspondingly such that the display device 112 will be in position with respect to the established manual-driving station, thereby allowing the driver to easily see the operational characteristics of the vehicle from the driver's position at any manual-driving station.

By incorporating the display device 112 on the steering column housing 114, as described with respect to FIGS. 8 and 9, the instrument panel display image 32 shown in FIG. 1 may not be needed. Therefore, the display device 112 shown in FIGS. 8 and 9 can supplement or replace all or parts of the display device 24 shown in FIG. 1.

Figure 10:
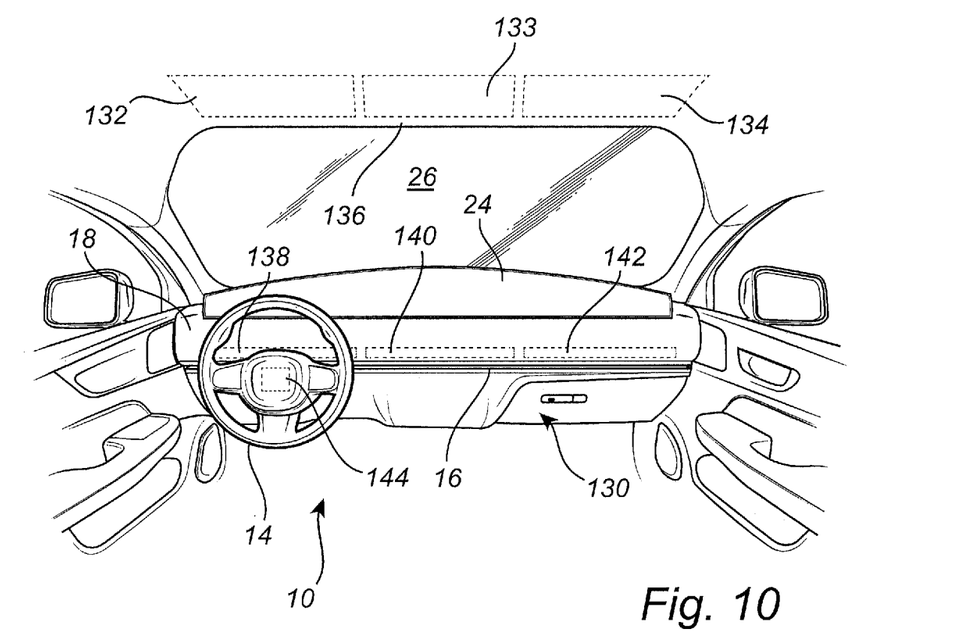
FIG. 10 is a diagram showing a forward-facing view of the inside of the vehicle of FIGS. 1-3 having an airbag system used in association with the steering assembly shown in FIGS. 1-3, according to various embodiments.

FIG. 10 shows an inside view of the vehicle 10 of FIG. 1 and illustrates an embodiment of an airbag system 130 used in association with a laterally movable steering assembly (e.g., the steering assembly 12 of FIG. 1, the steering assembly 110 of FIGS. 8-9, etc.). The airbag system 130 may be adapted to include multiple airbags arranged throughout the vehicle 10. In this embodiment, the airbag system 130 may include a left roof-mounted airbag 132, a center roof-mounted airbag 133, and a right roof-mounted airbag 134 arranged in a roof 136 of the vehicle 10. The airbag system 130 may further include a left dashboard-mounted airbag 138, a center dashboard-mounted airbag 140, and a right dashboard-mounted airbag 142 arranged in the dashboard 18 of the vehicle 10. Also, the airbag system 130, according to some embodiments, may include a steering wheel mounted airbag 144 arranged in the steering wheel 14.

The airbag system 130 may include control circuitry for detecting the position of the steering wheel 14 along the lateral track 16 to thereby define the manual-driving station. In this embodiment, three driver stations may be defined, but in other embodiments, more or fewer driver stations may be defined, based for instance on the number and positioning of the airbags. The three driver stations as depicted in FIG. 10 may include a left driver station, a center driver station, and a right driver station, whereby the steering wheel 14 can be fixed in a left-hand position, a center position, or a right position. The control circuitry of the airbag system 130 may be configured to deploy certain airbags based on the mode of operation or on the driver station established.

Thus, the airbag system 130 may be adapted to deploy certain airbags in the event of a vehicle collision that would normally trigger one or more airbags. For example, in the left manual-driving station mode, the left roof-mounted airbag 132, left dashboard-mounted airbag 138, and/or the steering wheel mounted airbag 144 may be deployed in response to a collision event. For the center driver station mode, the center roof-mounted airbag 133, center dashboard-mounted airbag 140, and/or the steering wheel mounted airbag 144 may be deployed in response to the collision event. Also, for the right driver station mode, the right roof-mounted airbag 134, right dashboard-mounted airbag 142, and/or the steering wheel mounted airbag 144 may be deployed in response to the collision event. Other deployment strategies may be used by the airbag system 130 according to the positioning of these or additional airbags.

Figure 11:
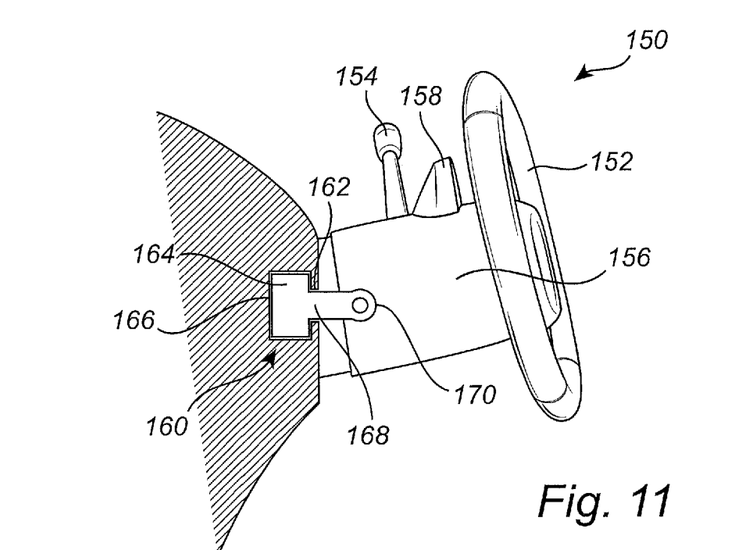
FIG. 11 is a diagram showing a partial cross-sectional side view of a steering assembly having a gear shifting device attached to a steering column housing of the steering assembly, according to various embodiments.
Figure 12:
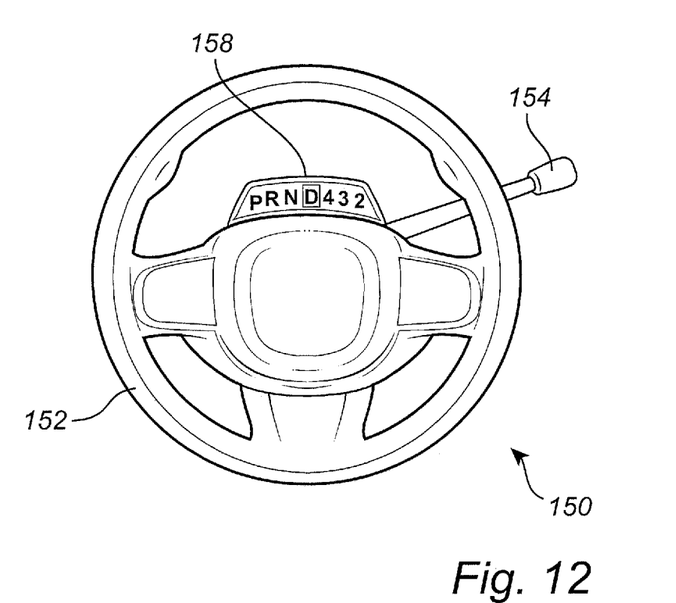
FIG. 12 is a diagram showing a front view of the steering assembly of FIG. 11, according to various embodiments.

FIG. 11 illustrates a side view of an embodiment of a steering assembly 150 shown partially in cross-section and FIG. 12 is a diagram showing a front view of the steering assembly 150 of FIG. 11. In the embodiment illustrated in FIGS. 11 and 12, the steering assembly 150 may include a steering wheel 152 that may be moved laterally or side-to-side along a track in a dashboard. Because of the variable positioning of the steering wheel in the lateral direction, the driver may at times be required to shift gears from the established manual-driving station. Therefore, the steering assembly 150 may include a gear shifting device 154 attached to a steering column housing 156 of the steering assembly 150. As such, the gear shifting device 154 may be adapted to move along with the steering wheel 152 so that the driver operating the vehicle can shift gears as needed. The steering column housing 156 may also include a gear indicator 158 for indicating the gear in which the vehicle currently resides.

Also shown in FIG. 11 is a track system 160, which may be used in any of the various embodiments of the steering assemblies (e.g., the steering assembly 12 shown in FIG. 1, the steering assembly 110 of FIGS. 8-9, and/or the steering assembly 150 of FIG. 11). Regardless, the track system 160 in this embodiment may include a track 162, which may be similar to track 16 shown in FIGS. 1-3, arranged in a lateral direction within the vehicle. The track system 160 may also include a runner 164 configured to slide within a chamber 166 of the track 162. The runner 164 may also act as a counter-weight for balancing the weight of the steering column housing 156 and steering wheel 152. To allow easy movement of the steering wheel 152 in the lateral direction, the chamber 166 may include grease or oil to reduce friction with the runner 164. To further reduce friction, the runner 164 and/or the chamber 166 may include ball bearings.

The track system 160 may further include an arm 168 that extends from the runner 164 to the steering column housing 156. The inside of the track 162 may also be greased to reduce friction with the arm 168. Also, the track 162 and/or arm 168 may include ball bearings to further reduce friction.

The end of the arm 168 of the track system 160 may include a hinge 170 for allowing the steering wheel 152 to be tilted forward or backward according to the driver's preferences. When tilted at a desired angle, the steering wheel 152 can be locked at a desired angle using any suitable locking device. Also, when the steering wheel 152 has been positioned along the track 162 at a desired or predetermined lateral position, the steering assembly 150 may further include another locking device (e.g., the locking device 122 shown in FIG. 8) for locking the steering wheel 152 at that position to give the steering wheel 152 stability during use and prevent the steering wheel 152 from inadvertently moving away from the desired position or manual-driving station.

Figure 13:
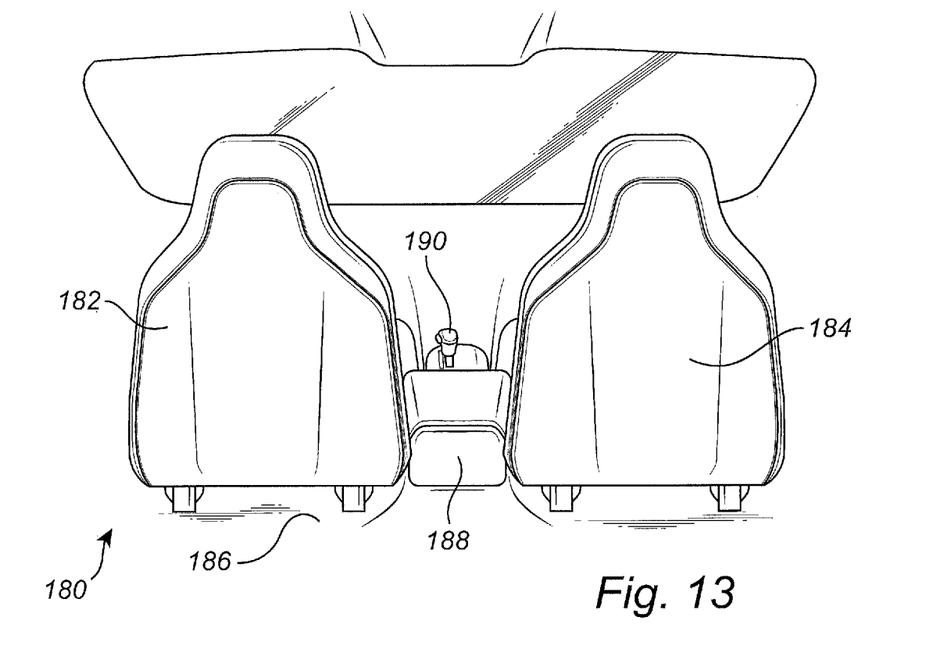
FIG. 13 is a diagram showing a forward-facing view of a vehicle having two fixed manual steering stations, according to various embodiments.

FIG. 13 is a diagram showing a forward-facing view from behind a front row of seats of a vehicle 180 configured with a laterally movable steering wheel. In this embodiment, the vehicle 180 may include a left front seat 182 and a right front seat 184, wherein the seats 182, 184 are securely mounted to the floor 186 of the vehicle 180. Thus, the left front seat 182 may be considered as defining a left driver station for manually driving the vehicle 180 from the left-hand side and the right front seat 184 may be considered as defining a right driver station for manually driving the vehicle 180 from the right-hand side. A center position may be used for AV modes.

According to some embodiments, the vehicle 180 may be adapted to include a center console 188 having a gear shifting device 190. The gear shifting device 190 may be positioned such that a driver in either one of the driver stations may operate the gear shifting device 190. Thus, the gear shifting device 190, along with the seats 182, 184 may have a fixed position within the vehicle 180.

Figure 14:
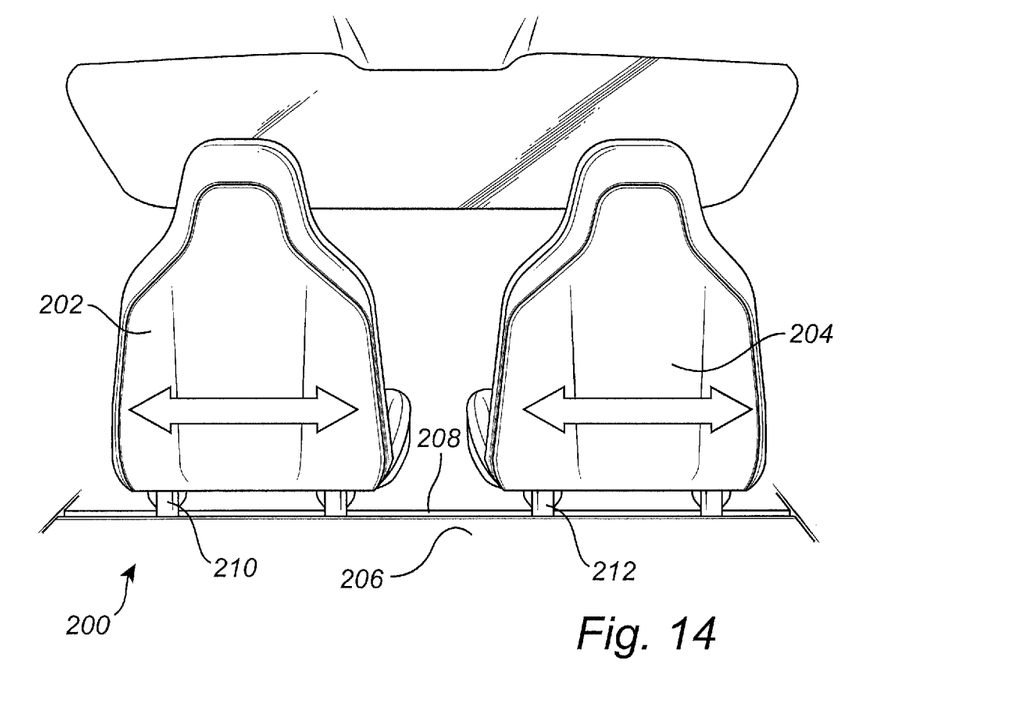
FIG. 14 is a diagram showing a forward-facing view of a vehicle having multiple manual steering stations and laterally movable seats, according to various embodiments.

FIG. 14 shows an alternative embodiment of a vehicle 200 having a laterally movable steering wheel. The vehicle 200 is shown in FIG. 14 from a forward-facing view from behind a front row of seats. In this embodiment, the vehicle 200 may include a left front seat 202 and a right front seat 204. However, according to this embodiment, one or both of the seats 202, 204 may be adapted to be moved side-to-side and positioned at various lateral locations within the vehicle 200. According to some alternative embodiments, the seats 202, 204 may be replaced by a bench seat that extends from one side of the interior of the vehicle 200 to the other.

The floor 206 of the vehicle 200 may include a seat track 208 mounted thereon. The seat track 208 may define a substantially horizontal path that may be substantially parallel to the track (e.g., track 16, 162) on which the steering wheel (e.g., steering wheel 14, 120, 152) is adapted to slide. The left front seat 202 may include a sliding base 210 configured to enable the left front seat 202 to be moved in the lateral direction along the seat track 208. Likewise, the right front seat 204 may include a sliding base 212 configured to enable the right front seat 204 to be moved in the lateral direction along the seat track 208. The seat track 208 may be adapted in some embodiments as two or more tracks for enabling lateral movement of two or more seats.

According to various embodiments, the vehicle 200 may be constructed without a center console, such as the center console 20 shown in FIG. 1 or the center console 188 shown in FIG. 13. Instead, the vehicle 200 may be equipped with a laterally slidable center console and/or laterally slidable gear shifting device (e.g., as described with respect to FIG. 15) for allowing the driver, regardless of the lateral position of the driver station, to be able to arrange a gear shifting device at a desired location for easy use.

As further described with respect to FIG. 14, the vehicle 200 may be a large vehicle, such as a truck, bus, recreational vehicle (RV), camper, etc. In this respect, if the vehicle 200 includes sufficient space in the front row of seats, a third seat may be installed in between the left seat 202 and right seat 204. Thus, the two or more seats may be adapted to slide laterally to position the seats with respect to the established manual-driving station. In some embodiments, there may be adequate space along the seat track 208 that at least one of the left and right seats 202, 204 can be positioned at any location between a far-left position and a far-right position. Thus, any number of possible driver stations can be established.

Similar to the act of fixing or locking the steering wheel 14, 120, 152 with respect to the track 16, 162 along which it can slide, the sliding bases 210, 212 may include locking device to lock the seats 202, 204 in place once they have been properly positioned along the seat track 208 to correspond with the positioning of the steering wheel. For example, the sliding bases 210, 212 may include one or more locking devices having levers, ratchet members, and/or other components for wedging or applying a locking member in or against the seat track 208 and/or floor 206.

Figure 15:
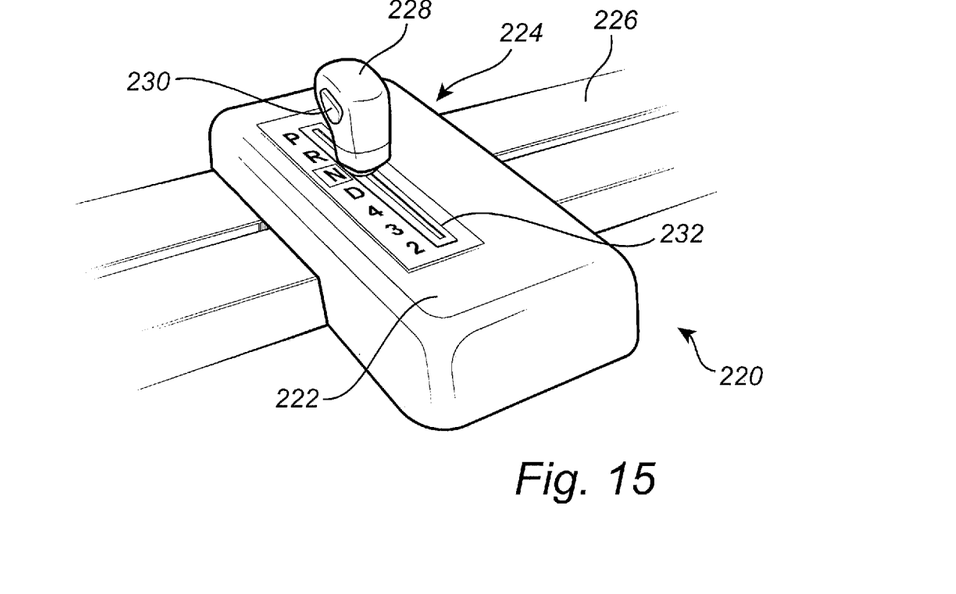
FIG. 15 is a diagram showing a top view of a laterally movable gear shifting device for use in association with the vehicle of FIG. 14, according to various embodiments.

FIG. 15 shows a diagram illustrating a top view of an embodiment of a laterally movable gear shifting assembly 220, which may be used in association with the vehicle 200 of FIG. 14. In this embodiment, the laterally movable gear shifting assembly 220 may include a console 222 adapted with a gear shifting device 224. The console 222, and thereby the gear shifting device 224 may be moved laterally along a shifter track 226. Thus, the console 222 may include any suitable release mechanism to allow the console 222 to move along the shifter track 226 and/or a locking mechanism to lock the console 222 in place once it is positioned at a desired location along the shifter track 226. The shifter track 226 may be oriented in a sliding direction along the floor 206 of the vehicle 200, whereby the sliding direction may be substantially parallel to the seat track 208, line of receivers 62, 64, and/or steering wheel tracks 16, 162, such that the steering wheels, acceleration activators, deceleration activators, seats, and gear shifting devices, can be moved side-to-side essentially in a unitary manner.

The gear shifting device 224 may include a handle 228 having a button 230. When the button 230 is pressed, the driver can shift gears by moving the handle 228 along a gear track 232 to set positions representing various gears, such as P, R, N, D, 4, 3, and 2. Fewer, more, or other gears may be included, depending on the vehicle. Because of the movability of the gear shifting device 224, the handle 228 may not be connected directly to mechanical actuators for shifting gears. Instead, the gear shifting device 224 may electrically sense the position of the handle 228 and electrically send signals to electromechanical devices for actuating the shifting of gears. Thus, the gear shifting device 224 may be adapted as a "shift-by-wire" device. In this respect, the vehicles and steering assemblies described in the present disclosure may include several systems that include electrical control activation elements, such that these activation elements are used in scenarios involving one or more of "steer-by-wire," "accelerate-by-wire," "brake-by-wire," and "shift-by-wire."

Therefore, when a driver seat (e.g., seats 202, 204) has been moved to a desired position according to a determined driver station location, the console 222 and gear shifting device 224 may also be moved to enable the driver to easily reach the gear shifting device 224 to shift gears as needed. The positioning of the driver seat (i.e., seat 202 or seat 204) and the positioning of the gear shifting device 224 may be coordinated with the positioning of the steering wheel (e.g., steering wheel 14, 120, or 152) of the various steering assemblies (e.g., steering assembly 12, 110, or 150) described in the present disclosure. The coordinated positioning of the steering wheel, driver seat, and gear shifting device may further be coordinated with the positioning of the acceleration activator device (e.g., acceleration activator device 52, 72, or 86) and the deceleration activator device (e.g., deceleration activator device 54, 74, or 88). The driver stations can therefore be established by the coordinated lateral positioning of these various components for driving the vehicle in a manual mode at any desired location.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. A steering system of a vehicle, the steering system comprising:
   a track assembly formed in a dashboard of the vehicle and oriented in a side-to-side orientation with respect to the vehicle, the side-to-side orientation being horizontal with respect to a ground surface and perpendicular with respect to a forward-facing direction of the vehicle;
   a steering wheel assembly movably coupled to the track assembly and adapted to slide laterally from side to side along the track assembly and be fixed in multiple of a center position, a left-hand position, and a right-hand position along the track assembly; and
   a display panel positioned on the dashboard and having a width traversing a length of the dashboard corresponding to at least a length of the track assembly comprising a reconfigurable instrument panel display positionable within the display panel in multiple of the center position, the left-hand position, and the right-hand position along the track assembly corresponding to the steering wheel assembly.

2. The steering system of claim 1, wherein fixing the steering wheel assembly in the left-hand position enables a driver to manually operate the vehicle from the left-hand side of the vehicle and fixing the steering wheel assembly the right-hand position enables the driver to manually operate the vehicle from the right-hand side of the vehicle.

3. The steering system of claim 1, wherein the steering wheel assembly is adapted to be fixed in all of the center position, the left-hand position, and the right-hand position.

4. The steering system of claim 1, wherein the steering wheel assembly is adapted to be moved laterally from side to side along the track assembly one of during manufacture and after manufacture.

5. The steering system of claim 1, wherein the vehicle is adapted to be operated in a first mode or a second mode, the first mode being defined as a fully human-operated mode and the second mode being defined as a driver-assisted mode, autonomous mode, automatic driving mode, self-driving mode, or driverless mode.

6. The steering system of claim 5, wherein, when operated in the second mode, the steering wheel assembly is adapted to be fixed in the center position along the track assembly.

7. The steering system of claim 6, wherein the steering wheel assembly is adapted to be collapsed under and extended from an instrument panel of the vehicle.

8. A vehicle defined by a front/back axis substantially oriented in a forward-facing direction, the vehicle comprising:
   a lateral track assembly formed in a dashboard of the vehicle and arranged substantially along a lateral axis perpendicular to the front/back axis of the vehicle; and
   a steering wheel assembly adapted to slide laterally along the lateral track assembly; and
   a display panel positioned on the dashboard and having a width traversing a length of the dashboard corresponding to at least a length of the lateral track assembly comprising a reconfigurable instrument panel display positionable within the display panel in multiple positions along the lateral track assembly corresponding to the steering wheel assembly.

9. The vehicle of claim 8, wherein the steering wheel assembly is adapted to be fixed in multiple of a center position, a left-hand position, and a right-hand position along the lateral track assembly.

10. The vehicle of claim 8, further comprising one or more of an acceleration activator device and a deceleration activator device adapted to be movably positioned in conjunction with a lateral sliding movement of the steering wheel assembly.

11. The vehicle of claim 10, wherein the one or more of the acceleration activator device and the deceleration activator device comprises a pressure sensitive pad, pneumatically-actuated sensor, or hydraulically-actuated sensor and is disposed in or on a floor mat or floor component of the vehicle.

12. The vehicle of claim 8, wherein the steering wheel assembly comprises a steering wheel adapted to rotate with respect to a steering column housing connected to a runner adapted to slide along the lateral track assembly.

13. The vehicle of claim 12, further comprising a display device attached to the steering column housing, the display device adapted to indicate at least one operational condition of the vehicle to a driver.

14. The vehicle of claim 12, further comprising a gear shifting device and a gear indicator attached to the steering column housing, the gear shifting device enabling a driver to shift gears of the vehicle.

15. The vehicle of claim 12, further comprising a locking device adapted to lock the steering column housing or runner at a fixed position along the lateral track assembly.

16. The vehicle of claim 8, further comprising an airbag system including a plurality of airbags, wherein, during a collision event, the airbag system is adapted to deploy one or more of the airbags based on the positioning of the steering wheel assembly along the lateral track assembly.

17. The vehicle of claim 8, further comprising a seat track assembly arranged substantially parallel with the lateral track assembly and one or more vehicle seats adapted to be slidably positioned along the seat track assembly in conjunction with a positioning of the steering wheel assembly along the lateral track assembly.

18. The vehicle of claim 8, further comprising a shifter track assembly arranged substantially parallel with the lateral track assembly and a gear shifting device adapted to be slidably positioned along the shifter track assembly in conjunction with a positioning of the steering wheel assembly along the lateral track assembly.

19. A vehicle comprising a steering wheel assembly adapted to be positioned in laterally variable locations with respect to the vehicle, the steering wheel assembly further adapted to enable a driver to manually operate the vehicle alternately from at least a left-hand side of the vehicle and a right-hand side of the vehicle, and a display panel positioned on a dashboard of the vehicle and having a width traversing a length of the dashboard between the left-hand side of the vehicle and the right-hand side of the vehicle comprising a reconfigurable instrument panel display positionable within the display panel in multiple positions coincident with the steering wheel assembly.

20. The vehicle of claim 19, wherein the steering wheel assembly includes a steering wheel, a steering column housing, and a runner adapted to slide laterally along a track assembly oriented substantially in a side-to-side configuration with respect to the vehicle.

* * * * *